(12) United States Patent
Abe et al.

(10) Patent No.: US 9,812,741 B2
(45) Date of Patent: Nov. 7, 2017

(54) METHOD OF CHARGING AND MAINTAINING LITHIUM ION SECONDARY BATTERY, BATTERY SYSTEM, VEHICLE AND BATTERY-MOUNTED DEVICE

(75) Inventors: Takeshi Abe, Okazaki (JP); Akira Tsujiko, Miyoshi (JP); Tomitaro Hara, Okazaki (JP); Keiko Wasada, Toyota (JP); Sachie Yuasa, Okazaki (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 397 days.

(21) Appl. No.: 13/264,800

(22) PCT Filed: Apr. 28, 2009

(86) PCT No.: PCT/JP2009/058378
§ 371 (c)(1),
(2), (4) Date: Dec. 6, 2011

(87) PCT Pub. No.: WO2010/125649
PCT Pub. Date: Nov. 4, 2010

(65) Prior Publication Data
US 2012/0068666 A1    Mar. 22, 2012

(51) Int. Cl.
*H02J 7/00*     (2006.01)
*H01M 10/44*    (2006.01)
(Continued)

(52) U.S. Cl.
CPC .......... *H01M 10/44* (2013.01); *H02J 7/0075* (2013.01); *H01M 4/5825* (2013.01); *H01M 10/0525* (2013.01); *Y02E 60/122* (2013.01)

(58) Field of Classification Search
USPC .................................................. 320/128, 132
See application file for complete search history.

(56) References Cited

U.S. PATENT DOCUMENTS 5,952,813 A * 9/1999 Ochiai .......................... 320/104
2008/0309288 A1   12/2008 Benckenstein et al.
(Continued)

FOREIGN PATENT DOCUMENTS

JP    2000-350370    12/2000
JP    2002-280080     9/2002
(Continued)

OTHER PUBLICATIONS

Extended European Search Report for EP Appl. No. 09843993.8 dated Dec. 2, 2011.
(Continued)

*Primary Examiner* — Samuel Berhanu
(74) *Attorney, Agent, or Firm* — Finnegan, Henderson, Farabow, Garrett & Dunner, LLP

(57) ABSTRACT

An object is to provide a method of charging and maintaining a lithium ion secondary battery which method is capable of preventing a decrease in the capacity of the battery. Another object is to provide a battery system capable of preventing a decrease in battery capacity, and a vehicle and a battery-mounted device which have such a battery system mounted therein. A method of charging and maintaining lithium ion secondary batteries 101 using positive active material particles 135 made from a two-phase coexistence type positive active material PM in a positive electrode plate 130 includes an overcharge step S7 for charging the lithium ion secondary batteries to bring their SOC (State of Charge) SC into an overcharge SOC not higher than 100% but higher than a target SOC, a return discharge step S8 for discharging, after the overcharge step, the lithium ion secondary batteries to make their SOC equal to the target SOC, and a maintaining step S10.

11 Claims, 12 Drawing Sheets

(51) Int. Cl.
*H01M 4/58* (2010.01)
*H01M 10/0525* (2010.01)

(56) References Cited

U.S. PATENT DOCUMENTS

| | | | |
|---|---|---|---|
| 2009/0229898 A1* | 9/2009 | Fujino et al. | 180/65.29 |
| 2010/0109608 A1* | 5/2010 | Buono | H02J 7/0019 320/121 |

FOREIGN PATENT DOCUMENTS

| | | |
|---|---|---|
| JP | 2002-359009 | 12/2002 |
| JP | 2003-346911 | 12/2003 |
| JP | 2004-222427 | 8/2004 |
| JP | 2006-12613 | 1/2006 |
| JP | 2006-107864 | 4/2006 |
| JP | 2008-181866 | 8/2008 |
| JP | 2008-259260 | 10/2008 |
| JP | 2010-73498 | 4/2010 |
| JP | 2010-74960 | 4/2010 |
| JP | 2010-211990 | 9/2010 |

OTHER PUBLICATIONS

International Search Report in International Application No. PCT/JP2009/058378; dated Aug. 11, 2009.
Written Opinion of the International Searching Authority in International Application No. PCT/JP2009/058378; dated Aug. 11, 2009.

\* cited by examiner

METHOD OF CHARGING AND MAINTAINING LITHIUM ION SECONDARY BATTERY, BATTERY SYSTEM, VEHICLE AND BATTERY-MOUNTED DEVICE

CROSS-REFERENCE TO RELATED APPLICATIONS

This application is a national phase application of International Application No. PCT/JP2009/058378, filed Apr. 28, 2009, the contents of which are incorporated herein by reference.

TECHNICAL FIELD

The present invention relates to a method of charging and maintaining (holding) a lithium ion secondary battery that uses a two-phase coexistence type positive active material in its positive electrode plate. The present invention also relates to a battery system equipped with such a lithium ion secondary battery and to a vehicle and a battery-mounted device which have such a battery system mounted therein respectively.

BACKGROUND ART

With the recent popularization of portable electronics such as cellular phones, notebook-sized personal computers and video camcorders as well as vehicles such as hybrid electric cars, there is a growing demand for lithium ion secondary batteries (hereinafter referred to as "batteries") for use in the driving power sources of those devices and vehicles.

As the batteries used in such applications, a variety of lithium ion secondary batteries such as LiFePO$_4$ have been proposed which use a two-phase coexistence type positive active material in the positive electrode plate (see Patent Documents 1 and 2).

RELATED ART DOCUMENTS

Patent Documents

Patent Document 1: JP-A-2006-012613
Patent Document 2: JP-A-2002-280080

DISCLOSURE OF THE INVENTION

Problems to be Solved by the Invention

It should be noted that the two-phase coexistence type positive active material is a substance in which a first phase and a second phase can stably coexist in one particle of positive active material, the first phase being a Li-containing compound such as LiFePO$_4$ in which Li ions are inserted, whereas the second phase is the compound (e.g., FePO$_4$) that is left after the Li ions are released (desorbed) from the first phase compound by charging.

The positive active material particles constituted by the two-phase coexistence type positive active material entirely assume the first phase when the battery is in a fully discharged state, whereas they entirely assume the second phase when the battery is in a fully charged state. In cases where the battery is charged, the positive active material particles release the Li ions from their radially outside surfaces, causing a gradual phase transition from the first phase to the second phase, so that the positive active material particles become the second phase at least in their outer peripheral portions during the charging. In cases where the battery is discharged on the other hand, the Li ions are inserted into the positive active material particles from their radially outside surfaces, causing a gradual phase transition from the second phase to the first phase, so that the positive active material particles become the first phase at least in their outer peripheral portions during the discharging.

According to the study by the inventors, the batteries using the two-phase coexistence type positive active material in the positive electrode plate have been found to tend to decrease battery capacity when the batteries are charged and subsequently maintained at the state of charge (SOC) at that time. The probable reason for this is as follows. If the positive active material is in the second phase state, the metal ions (e.g., Fe of FePO$_4$) contained in the compound often dissolve into the electrolytic solution. This dissolving causes a decrease in the quantity of the positive active material (e.g., FePO$_4$ and LiFePO$_4$ obtained by inserting Li into FePO$_4$), or the metal ions, which have dissolved out, cause degradation of the positive electrode or negative electrode. Therefore, there is a risk that if the batteries are charged with the outer peripheral portions of the positive active material particles becoming the second phase and maintained in this condition for a prolonged time, the capacity of the batteries would progressively decrease owing to the dissolving out of the metal ions.

It has also been found that when the positive active material is in the first phase state, the metal ions included in this material are unlikely to dissolve into the electrolytic solution.

The present invention is directed to overcoming the foregoing problem and an object of the invention is therefore to provide a method of charging and maintaining a lithium ion secondary battery which method is capable of preventing a decrease in the capacity of the battery. Another object of the invention is to provide a battery system capable of preventing a decrease in battery capacity and a vehicle and a battery-mounted device which have such a battery system mounted therein.

Means of Solving the Problems

According to one aspect of the invention, there is provided a method of charging and maintaining a lithium ion secondary battery that uses positive active material particles made from a two-phase coexistence type positive active material in its positive electrode plate, the method comprising: an overcharge step for charging the lithium ion secondary battery to an overcharge SOC (state of charge) that is not higher than 100% SOC but higher than a target SOC; a return discharge step for discharging, after the overcharge step, the lithium ion secondary battery to make the SOC of the battery equal to the target SOC; and a maintaining step for maintaining the SOC of the lithium ion secondary battery at the target SOC.

According to the above battery charging and maintaining method, the battery is once charged to an overcharge SOC level and therefore the second phase is formed in the outer peripheral portions of the positive active material particles in this condition. Thereafter, the battery is discharged in the return discharge step, thereby making the SOC of the battery equal to a target SOC level. In this condition, a layer made of the first phase is formed in the outermost peripheries of the positive active material particles, which first phase is unlikely to cause dissolving of the metal ions into the electrolytic solution. Thus, the battery charging and maintaining method can manage to prevent the metal ions from dissolving out of the positive active material particles (the second phase) to restrain the decrease of the capacity of the battery.

As explained earlier, the two-phase coexistence type positive active material is a substance in which a first phase and a second phase stably can coexist in one particle of positive active material, the first phase being an Li-containing compound such as $LiFePO_4$ in which Li ions are inserted, whereas the second phase is the compound (e.g., $FePO_4$) that is left after the Li ions are desorbed from the first phase compound by charging.

In addition, the positive active material particles made from the two-phase coexistence type positive active material have the above-described characteristics. That is, when the battery is in a fully discharged state, the positive active material particles entirely become the first phase, whereas when the battery is in a fully charged state, they entirely become the second phase. When charging the battery, the positive active material particles release the Li ions from their radially outside surfaces, causing a gradual phase transition from the first phase to the second phase, so that the positive active material particles become the second phase at least in their outer peripheral portions during the charging. When discharging the battery on the other hand, the Li ions are inserted into the positive active material particles from their radially outside surfaces, causing a gradual phase transition from the second phase to the first phase, so that the positive active material particles become the first phase at least in their outer peripheral portions during the discharging.

In the above lithium ion secondary battery charging and maintaining method, preferably, the overcharge step includes charging the battery to the overcharge SOC that is higher than the target SOC by 2% or more.

It has been found from the study by the inventors that the decrease of the battery capacity can be unfailingly restrained by discharging by an amount equivalent to an SOC difference of 2% or more in the return discharge step. The reason for this is thought to be that such discharge enables it to reliably form a layer of the first phase in the outermost periphery of each positive active material particle.

Based on this knowledge, the overcharge SOC is made higher than the target SOC by 2% or more in the overcharge step of the above lithium ion secondary battery charging and maintaining method. This enables it to reliably restrain the decrease of the capacity of the battery.

In either one of the above-described lithium ion secondary battery charging and maintaining methods, preferably, the method further comprises: a maintenance prediction step for predicting whether the lithium ion secondary battery will be maintained at the target SOC for no less than one hour, the target SOC being higher than a present SOC; and a selection step for selecting execution of the overcharge step, the return discharge step and the maintaining step if it is predicted in the maintenance prediction step that the lithium ion secondary battery will be maintained at the target SOC for no less than one hour.

The above lithium ion secondary battery charging and maintaining method has the maintenance prediction step and the selection step. Therefore, even if the battery is maintained for as long as one hour or more after charging, during which a decrease tends to occur in battery capacity, the decrease of the capacity of the battery can be restrained reliably.

According to another aspect of the invention, there is provided a battery system comprising: a lithium ion secondary battery that uses positive active material particles made from a two-phase coexistence type positive active material in its positive electrode plate; and charge/discharge control means for controlling the charge and discharge of the lithium ion secondary battery, the charge/discharge control means comprising: overcharge means for charging the lithium ion secondary battery to an overcharge SOC (state of charge) that is not higher than 100% SOC but higher than a target SOC; return discharge means for discharging, after operation of the overcharge means, the lithium ion secondary battery to make the SOC of the battery equal to the target SOC; and maintaining means for maintaining the SOC of the lithium ion secondary battery at the target SOC.

The charge/discharge control means of the above battery system includes the overcharge means, the return discharge means and the maintaining means. To maintain the battery after charging, the SOC of the battery is once charged to an overcharge SOC. Thereafter, the battery is discharged to make the SOC of the battery equal to a target SOC and then, the battery is maintained. When the battery is thus charged, a layer of the first phase is formed in the outermost peripheries of the positive active material particles, which first phase is unlikely to cause dissolving of the metal ions into the electrolytic solution. Thus, when charging and then maintaining the battery, the metal ions can be prevented from dissolving out of the positive active material particles (the second phase) to restrain the decrease of the capacity of the battery.

In the above battery system, preferably, the overcharge means charges the battery to the overcharge SOC that is higher than the target SOC by 2% or more.

The inventors have found from their study that a decrease in battery capacity can be unfailingly prevented by discharging by an amount equivalent to an SOC difference of 2% or more in the return discharge step. The probable reason for this is that such discharge enables it to reliably form a layer of the first phase in the outermost periphery of each positive active material particle.

Based on this knowledge, the overcharge SOC to which the overcharge means charges is made higher than the target SOC by 2% or more in the above battery system. This enables it to reliably restrain the decrease of the capacity of the battery.

In either one of the above-described battery systems, preferably, the charge/discharge control means further comprises: maintenance prediction means for predicting whether the lithium ion secondary battery will be maintained at the target SOC for no less than one hour, the target SOC being higher than a present SOC; and selection means for selecting execution of the overcharge means, the return discharge means, and the maintaining means if it is predicted by the maintenance prediction means that the lithium ion secondary battery will be maintained at the target SOC for no less than one hour.

The charge/discharge control means of the above battery system includes the SOC maintenance prediction means and the selection means. Therefore, even if the battery is maintained for as long as one hour or more after charging, during which a decrease tends to occur in battery capacity, the decrease of the capacity of the battery can be unfailingly restrained.

According to another alternative aspect of the invention, there is provided a vehicle rechargeable from an external power source, the vehicle including one of the aforementioned battery systems.

The above vehicle includes the battery system and is therefore capable of reliably restraining the decrease of the capacity of the battery.

Examples of the vehicle rechargeable from an external power source include not only plug-in hybrid electric vehicles and plug-in electric vehicles whose secondary batteries are charged by plugging in, for instance, a socket of an externally installed household electric power source but also electric vehicles which are charged by an externally installed rapid charger (external power supply equipment).

According to another aspect of the invention, there is provided a battery-mounted device including one of the aforementioned battery systems.

The above battery-mounted device includes the battery system and is therefore capable of reliably preventing the decrease of the capacity of the battery.

The battery-mounted device may be any devices as long as they have a battery and use the battery as at least one of their energy sources. Examples of the battery-mounted device include personal computers, cellular phones, battery-driven electric tools, permanent power supply systems, various battery-driven household electric appliances, office equipment and industrial equipment.

According to another aspect of the invention, there is provided a battery system including: a lithium ion secondary battery using positive active material particles in its positive electrode plate, the positive active material particles being made from a two-phase coexistence type positive active material in which a first phase including Li ions inserted therein and a second phase from which the Li ions have been desorbed coexist; and charge/discharge control means for controlling the charge and discharge of the lithium ion secondary battery, wherein the battery system comprises: SOC maintenance prediction means for predicting whether the lithium ion secondary battery will be maintained at a target SOC for no less than one hour; first phase forming means for making the SOC of the lithium ion secondary battery equal to the target SOC and making the outermost peripheries of the positive active material particles be the first phase if the SOC maintenance prediction means predicts that the battery will be maintained for no less than one hour; and maintaining means for maintaining the SOC of the lithium ion secondary battery at the target SOC.

The above-described battery system includes the SOC maintenance prediction means; the first phase forming means for making the SOC of the lithium ion secondary battery equal to the target SOC and making the outermost peripheries of the positive active material particles be the first phase if the SOC maintenance prediction means predicts that the battery will be maintained for no less than one hour; and the maintaining means for maintaining the SOC of the battery at the target SOC. This configuration makes it possible to prevent the metal ions from dissolving out of the positive active material particles (the second phase) into the electrolytic solution thereby to properly restrain the decrease of the capacity of the battery when maintaining the battery at the target SOC.

DESCRIPTION OF THE REFERENCE SIGNS 1, 301 Vehicle
20 PHV controller (Charge and discharge control means, Overcharge means, Return discharge means, Maintaining means, Maintenance prediction means, Selection means, SOC maintenance prediction means, First phase forming means)
101 Battery (Lithium ion secondary battery)
130 Positive electrode plate
135 Positive active material particle
135E Outermost periphery (Outermost Periphery (of Positive active material particle))
200 Notebook PC (Battery-mounted device)
M1, M2, M3 Battery system
PM Positive active material
PM1 First phase
PM2 Second phase
SC1 Present charge state (Present SOC)
SC2 Overcharge state (Overcharge SOC)
SC3 Target charge state (Target SOC)

MODE FOR CARRYING OUT THE INVENTION

First Embodiment

Referring now to the accompanying drawings, the invention will be described according to a first embodiment.

Figure 1:
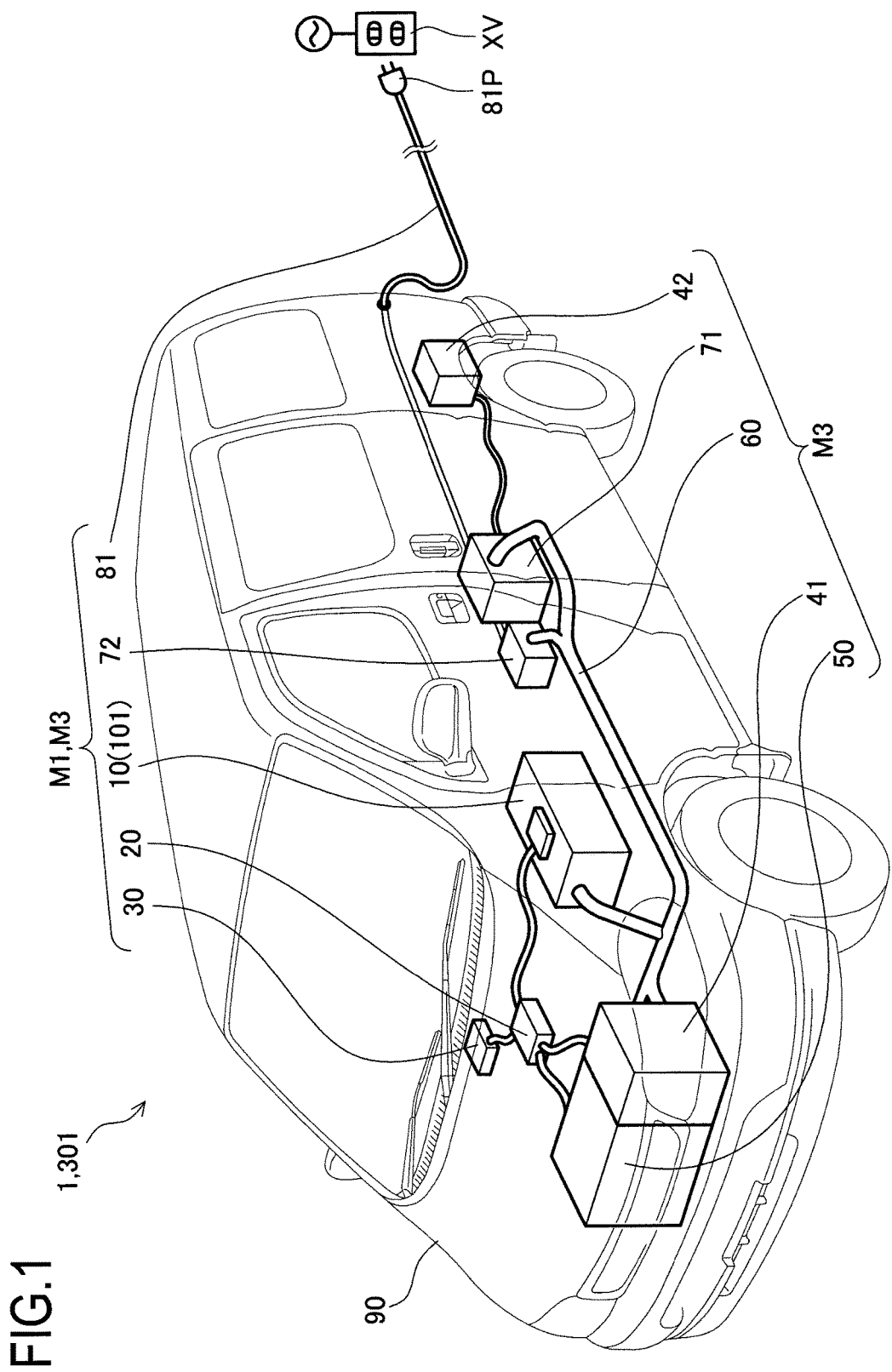
FIG. 1 is a perspective view of a vehicle in first and third embodiments.

First, a vehicle 1 constructed according to the first embodiment will be described. FIG. 1 shows a perspective view of the vehicle 1.

The vehicle 1 includes a plurality of lithium ion secondary batteries 101 (hereinafter referred to as "batteries 101") that constitute an assembled battery 10, a plug-in hybrid vehicle controller (hereinafter referred to as "PHV controller") 20, and a next operating time setting device 30 for setting the next time the driver starts to operate the vehicle 1. The vehicle 1 is a plug-in hybrid vehicle having, in addition to these components, a front motor 41, a rear motor 42, an engine 50, a cable 60, an inverter 71, a converter 72, a vehicle body 90 and a plug-equipped cable 81 having a plug 81P attached to the leading end thereof.

The vehicle 1 includes a battery system M1 composed of the above-described assembled battery 10, PHV controller 20, next operating time setting device 30, converter 72 and plug-equipped cable 81 (plug 81P).

During vehicle operation, the vehicle 1 can be driven by means of the front motor 41 and the rear motor 42 similarly to electric vehicles, but also by means of the engine 50 in combination with the front motor 41 and the rear motor 42 similarly to hybrid electric vehicles. After completion of operation of the vehicle 1, the plurality of batteries 101 constituting the assembled battery 10 can be charged, similarly to electric vehicles, using the battery system M1 with the plug 81P of the plug-equipped cable 81 inserted into an external electric power source XV installed outside the vehicle 1.

The PHV controller 20 of the vehicle 1 includes a microcomputer (not shown) that is provided with a CPU, ROM and RAM and operated according to a specified program. The PHV controller 20 is communicable with the next operating time setting device 30, the front motor 41, the rear motor 42, the engine 50, the inverter 71 and the converter 72 respectively and performs various control operations in accordance with the respective conditions of the components. For instance, the PHV controller 20 performs charge control when the assembled battery 10 (batteries 101) is charged from the external electric power source XV through the plug-equipped cable 81 (plug 81P) and discharge control when the assembled battery 10 (batteries 101) is discharged.

Figure 2:
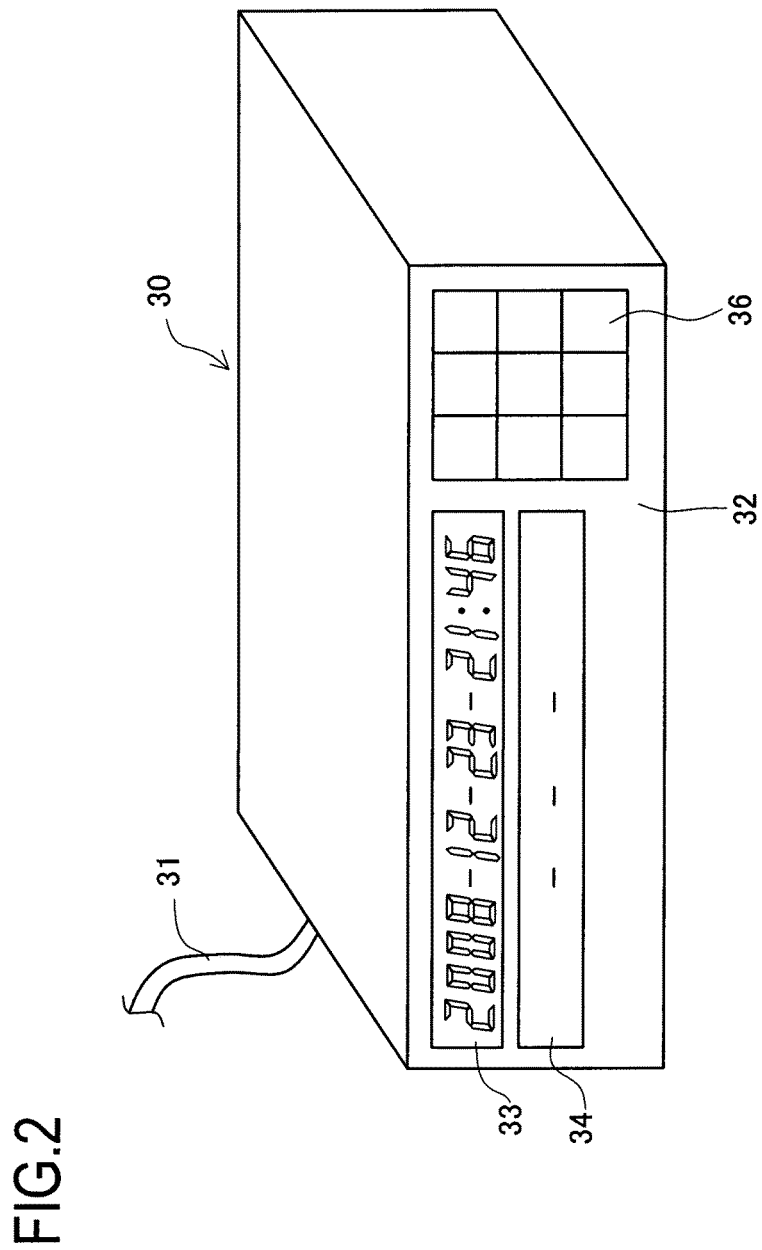
FIG. 2 is a perspective view of a next operating time setting device in the first and third embodiments.

As shown in FIG. 2, the next operating time setting device 30 in the form of a rectangular box includes, on a panel unit 32 that constitutes one of the side surfaces of the setting device 30, an operation button unit 36 including a plurality of buttons arranged in order, a present time display unit 33 for displaying the present time and a next operating time display unit 34 for displaying the next operation starting time. The next operating time setting device 30 also includes an internal battery (not shown) serving as a power source for operating the next operating time setting device 30 in addition to a connection cable 31 that extends outwardly from the setting device 30 so as to be connected to the PHV controller 20. The panel unit 32 is exposed inside the operator's cab of the vehicle 1 so that the user (e.g., driver) can easily operate the next operating time setting device 30 or check the displays.

Of these display units, the present time display unit 33 displays a present time CL0 (year (Gregorian calendar year), month, day, hour, minute) of a built-in clock (not shown) provided in the next operating time setting device 30.

The next operating time display unit 34 displays the next operating time CL1 (year (Gregorian calendar year), month, day, hour, minute) the driver uses the vehicle 1, the next operating time CL1 being set by the driver inputting through the operation button unit 36.

Figure 3:
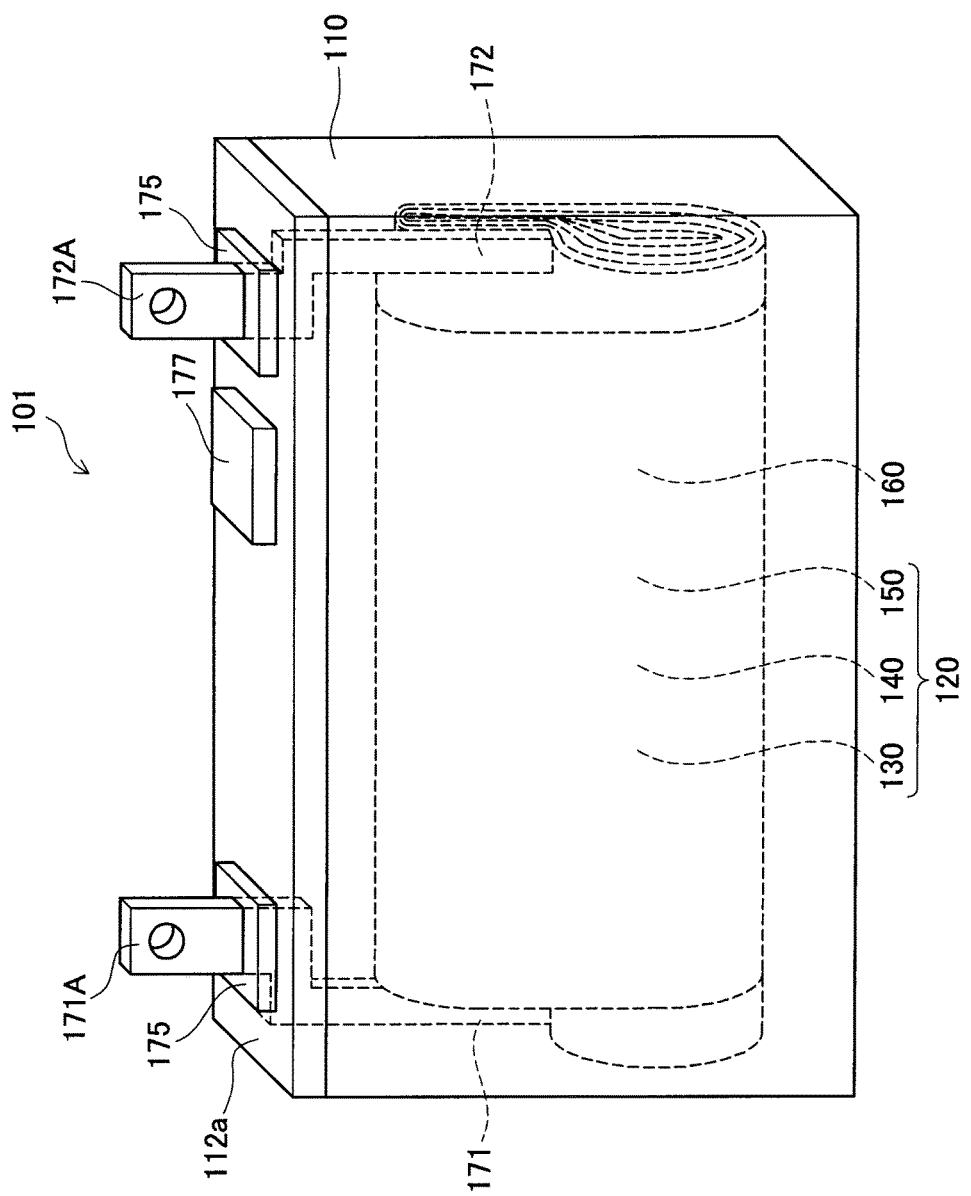
FIG. 3 is a transparent perspective view of a battery in the first, second, and third embodiments.

The assembled battery 10 internally accommodates one hundred wound batteries 101 each of which uses a positive electrode plate 130 (described later) in a power generating element 120. As shown in FIG. 3, the batteries 101 have the power generating element 120 and an electrolytic solution 160 that are housed in a rectangular box-like battery case 110.

Referring to FIG. 3, a positive terminal 171A located at the leading end of a positive current collector 171 connected to the positive electrode plate 130 upwardly projects from an upwardly facing case surface 112*a* of the battery case 110. In addition, a negative terminal 172A located at the leading end of a negative current collector 172 connected to a negative electrode plate 140 upwardly projects as shown in FIG. 3. With this configuration, the batteries 101 are capable of taking electric energy in and out of the power generating element 120 through the positive terminal 171A and the negative terminal 172A.

An insulating member 175 made from resin is interposed between the battery case 110 and the positive terminal 171A and between the battery case 110 and the negative terminal 172A respectively to insulate them. A safety valve 177 in the form of a rectangular plate is hermetically attached to the case surface 112*a*.

The electrolytic solution 160 is an organic electrolytic solution prepared by adding $LiPF_6$ to a mixed organic solvent as a solute, the organic solvent being prepared by mixing EC (ethylene carbonate), EMC (ethyl methyl carbonate) and DMC (dimethyl carbonate).

The power generating element 120 is formed by winding the strip-shaped positive electrode plate 130 and negative electrode plate 140 into a flat form, with a strip-shaped separator 150 interposed therebetween, which separator 150 is made from a porous polypropylene-polyethylene composite film. The positive electrode plate 130 and negative electrode plate 140 of the power generating element 120 are welded to the plate-shaped positive current collector 171 and negative current collector 172 respectively, the collectors 171, 172 being bent in crank form.

The negative electrode plate 140 of the power generating element 120 includes a strip-shaped negative foil (not shown) made from copper and two negative active material layers (not shown) that are laid over both main surfaces of the negative foil respectively. These negative active material layers contain a natural graphite-based carbon material (not shown), a binding agent (not shown) and a thickening agent (not shown).

Figure 4:
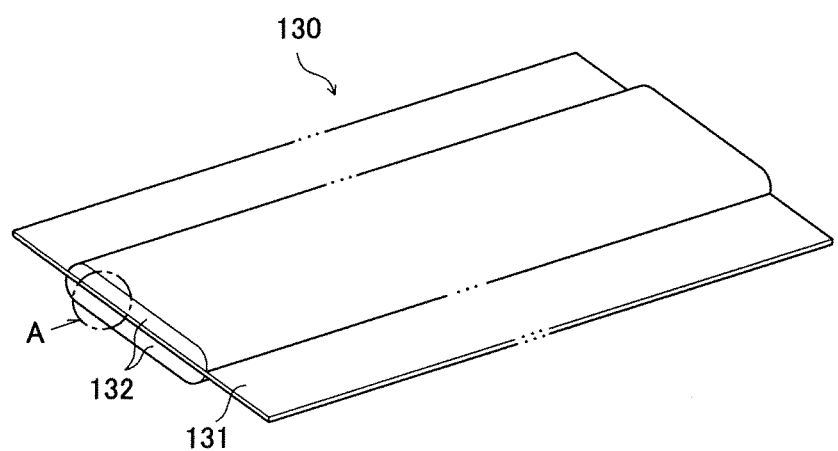
FIG. 4 is a perspective view of a positive electrode plate in the first, second, and third embodiments.
Figure 5:
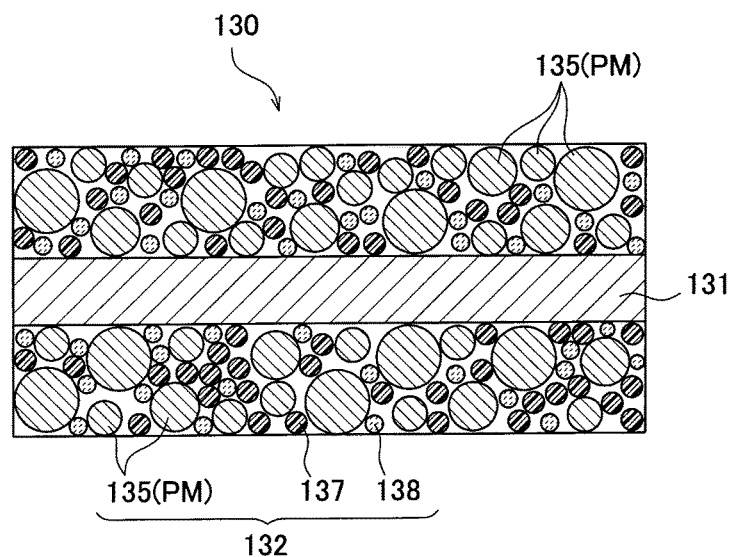
FIG. 5 is a partial enlarged end view of (Part A in FIG. 4) the positive electrode plate in the first, second, and third embodiments.

As shown in FIG. 4, the positive electrode plate 130 includes a strip-shaped positive foil 131 made from aluminum and two positive active material layers 132 that are laid over both main surfaces of the positive foil 131 respectively. These positive active material layers 132 are formed by coating with a material that is prepared by mixing and kneading positive active material particles 135 made from a two-phase coexistence type positive active material PM consisting of $LiFePO_4$, a binding agent 137 consisting of polyvinylidene-fluoride and a conducting auxiliary agent consisting of acetylene black (see FIG. 5).

Of the above-described materials, the positive active material particles 135 will be described with reference to FIGS. 6 and 7.

Figure 6:
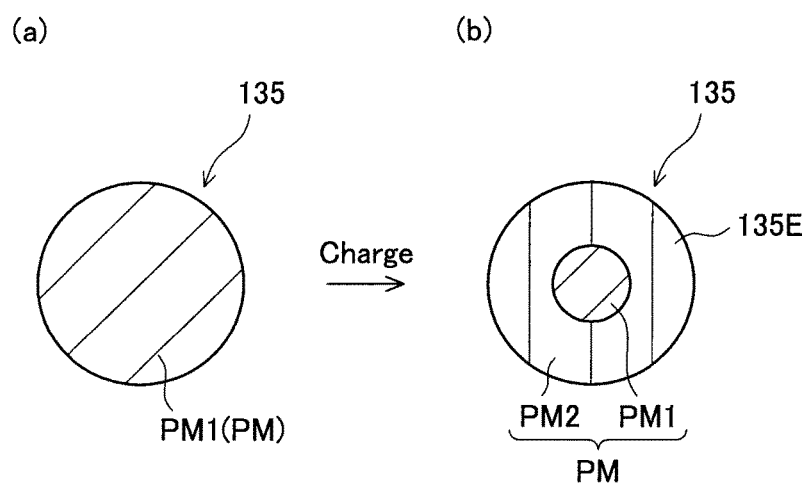
FIG. 6 is an explanatory view to show a positive active material particle in the first, second, and third embodiments, (a) showing the particle of a battery in a fully discharged state and (b) showing the particle of the battery during charging.
Figure 7:
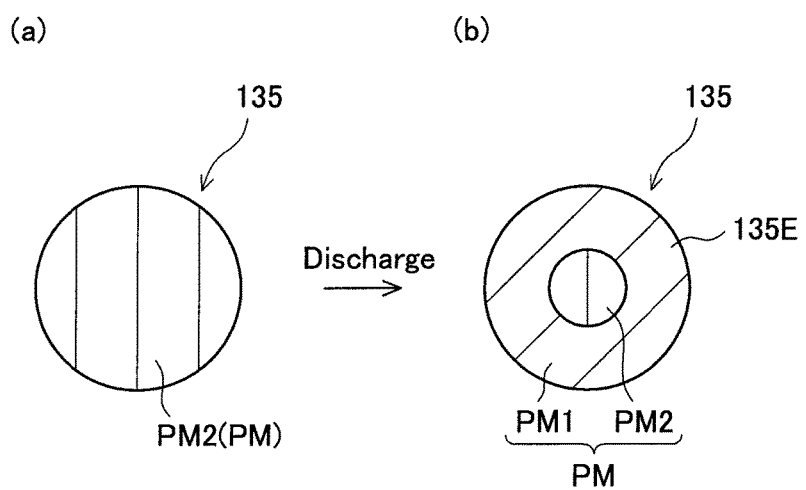
FIG. 7 is an explanatory view to show a positive active material particle in the first, second, and third embodiments, (a) showing the particle of a battery in a fully charged state and (b) showing the particle of the battery during discharging.

When the batteries 101 are in a fully discharged state, the positive active material particles 135 entirely assume the first phase PM1 that is constituted by an Li-containing compound ($LiFePO_4$ in the first embodiment) having Li ions inserted therein (see FIG. 6(*a*)). If the batteries 101 in such a state are continuously charged, the Li ions will be desorbed from the radially outside surfaces of the positive active material particles 135, so that a phase transition gradually occurs from the first phase PM1 to the second phase PM2.

The second phase PM2 is the compound (FePO$_4$ in the first embodiment) left after the Li ions are desorbed.

Therefore, at least the outermost peripheries 135E of the positive active material particles 135 assume the second phase PM2 during the charging (see FIG. 6(b)).

When the batteries 101 are in a fully charged state, the positive active material particles 135 entirely assume the second phase PM2 (see FIG. 7(a)). If the batteries 101 in such a state are continuously discharged, the Li ions will be inserted into the positive active material particles 135 from their radially outside surfaces, so that a phase transition will gradually occur from the second phase PM2 to the first phase PM1.

Therefore, at least the outermost peripheries 135E of the positive active material particles 135 assume the first phase PM1 during the discharging (see FIG. 7(b)).

According to the study by the inventors, it has been found that if the state of charge (SOC) of the batteries 101 having the above-described positive active material particles 135 in the positive electrode plate 130 is maintained or held after charging, the capacity of the batteries 101 tends to decrease.

The reason for this is thought to be that when the positive active material PM is in the second phase PM2 state, the metal ions (Fe in the first embodiment) contained in the compound dissolve into the electrolytic solution 160 in some cases, so that the quantity of the positive active material PM decreases owing to the dissolving, or the metal ions, which have dissolved out, cause degradation of the positive electrode plate 130 or the negative electrode plate 140. Therefore, if the batteries 101 are left in the electrolytic solution 160 for a long time after charged, with the outer peripheries 135E of the positive active material particles 135 of the batteries 101 being in the second phase PM2 state as shown in FIG. 6(b), the metal ions from the second phase PM2 will dissolve into the electrolytic solution 160 resulting in a progressive decrease in the capacity of the batteries 101.

It has also been found that when the positive active material PM is in the first phase PM1 state, the metal ions contained in the positive active material PM are unlikely to dissolve into the electrolytic solution 160.

To make the SOC of the batteries 101 having the positive active material particles 135 equal to a target SOC SC3, the batteries 101 are firstly charged to an overcharge SOC SC2 that is higher than the target SOC SC3 and then, the batteries 101 are discharged up to the target SOC SC3. With this process, a layer of the first phase PM1, which is unlikely to dissolve into the electrolytic solution 160, is formed on the outermost peripheries 135E of the positive active material particles 135.

First, the relationship between charging patterns and the rate of decrease in the capacity of the batteries 101 was checked in order to figure out the characteristics of the batteries 101 (positive active material particles 135).

Eleven batteries 101 were prepared (Examples 1 to 9 and Comparative Examples 1 and 2 were prepared which varied in the pattern of charging). All of the batteries prepared were unused after production.

A capacity test was conducted on each of the batteries of Examples 1 to 9 and Comparative Examples 1 and 2. More specifically, the batteries of Examples 1 to 9 and Comparative Examples 1 and 2 were respectively subjected to a constant current charge up to 4.1V with a constant current of 0.2 C. After reaching 4.1V, the batteries were subjected to a constant voltage charge in which the value of current was gradually reduced up to 0.02 C while the voltage being maintained. Thereafter, the batteries were discharged up to 3.0V with a current of 0.2 C.

For each of Examples 1 to 9 and Comparative Examples 1 and 2, the above charge and discharge cycle was repeated three times, and the average of battery capacity values was obtained after three discharges and regarded as the initial battery capacity.

A preservation test was conducted on each of the batteries of Examples 1 to 9 and Comparative Examples 1 and 2 at a temperature of 45° C. for 30 days.

Concretely, each of the batteries of Examples 1 to 9 was once charged until its SOC becomes equal to the overcharge SOC SC2, followed by a discharge to a target SOC SC3. Thereafter, the battery was left in a thermostatic chamber (not shown) having a room temperature of 45° C. for 30 successive days. That is, each battery was maintained after charging in a charging pattern according to which a charge is followed by a slight discharge.

More concretely, the values of the overcharge SOC SC2 for the batteries of Examples 1 to 4 were set to SOC 91%, SOC 93%, SOC 95% and SOC 100%, respectively. The values of the target SOC SC3 for these batteries were all set to SOC 90%.

Similarly, the values of the overcharge SOC SC2 for the batteries of Examples 5 to 9 were set to SOC 81%, SOC 83%, SOC 85%, SOC 90% and SOC 100%, respectively. The values of the target SOC SC3 for these batteries were all set to SOC 80%.

For comparison purpose, the battery charged to SOC 90% (Comparative Example 1) and the battery charged to SOC 80% (Comparative Example 2) were similarly left in the thermostatic chamber after charging. It should be noted that, in these Comparative Examples, the overcharge SOC SC2 is set to be equal to the target SOC SC3 as shown in TABLE 1.

After the above-described preservation test, the batteries of Examples 1 to 9 and Comparative Examples 1 and 2 were again subjected to the capacity test similar to that conducted before the preservation test. Then, the rate of decrease in battery capacity (the ratio of the battery capacity after the preservation test to the initial battery capacity) was calculated for each of the batteries of Examples 1 to 9 and Comparative Examples 1 and 2 (see TABLE 1).

TABLE 1

|        | Overcharge SOC SC2 | Target SOC SC3 | (SC2) − (SC3) | Decrease Rate of Battery capacity |
|--------|--------------------|----------------|---------------|-----------------------------------|
| CEx. 1 | SOC 90%            | SOC 90%        | 0             | 20%                               |
| Ex. 1  | SOC 91%            | SOC 90%        | 1             | 14%                               |
| Ex. 2  | SOC 93%            | SOC 90%        | 3             | 8%                                |
| Ex. 3  | SOC 95%            | SOC 90%        | 5             | 8%                                |
| Ex. 4  | SOC 100%           | SOC 90%        | 10            | 8%                                |
| CEx. 2 | SOC 80%            | SOC 80%        | 0             | 18%                               |
| Ex. 5  | SOC 81%            | SOC 80%        | 1             | 12%                               |
| Ex. 6  | SOC 83%            | SOC 80%        | 3             | 5%                                |
| Ex. 7  | SOC 85%            | SOC 80%        | 5             | 5%                                |
| Ex. 8  | SOC 90%            | SOC 80%        | 10            | 5%                                |
| Ex. 9  | SOC 100%           | SOC 80%        | 20            | 5%                                |

Ex.: Example,
CEx.: Comparative Example

It is understood from TABLE 1 that the rate of decrease in battery capacity is 20% in Comparative Example 1 and 18% in Comparative Example 2, these Comparative Examples being not subjected to a discharge after charging. Compared to these Comparative Examples, the rates of decrease of Examples 1 to 4 and Examples 5 to 9, which were subjected to a discharge after charging, are smaller. It can be understood from this that the decrease in battery capacity can be restrained by discharging to the target SOC SC3 after a charge to the overcharge SOC SC2 that is higher than the target SOC SC3.

In Examples 2 to 4 and Examples 6 to 9 in which the overcharge SOC SC2 was made higher than the target SOC SC3 by 3% or more, the rate of decrease in battery capacity can be more reduced compared to Examples 1 and 5. It is understood from this that the rate of decrease in battery capacity can be further reduced by making the overcharge SOC SC2 higher than the target SOC SC3 by 3% or more.

Figure 8:
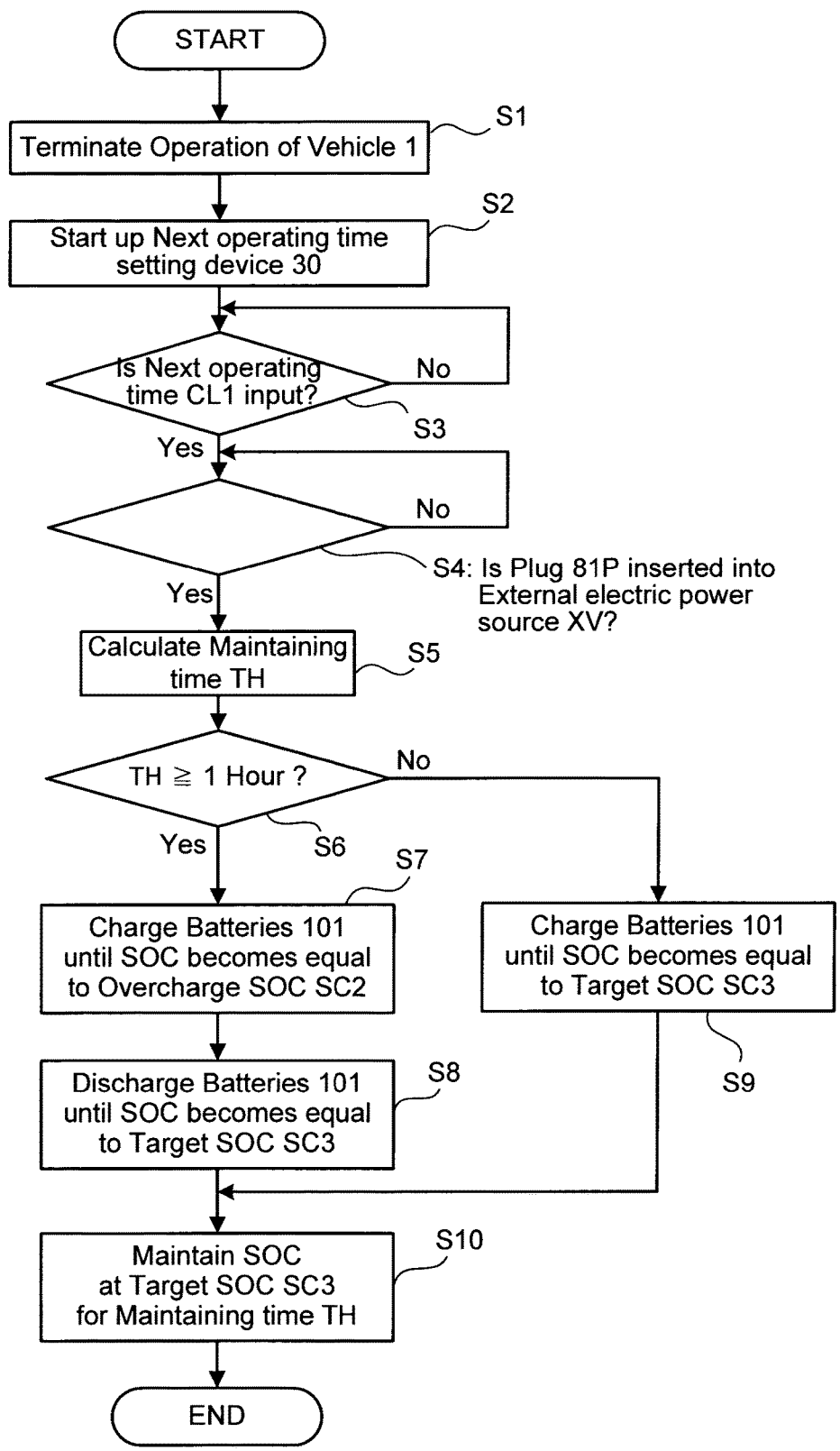
FIG. 8 is a flowchart showing a method of charging and maintaining a battery in the first embodiment.

With reference to the flow chart of FIG. 8, the charging and maintaining method using the battery system M1 of the first embodiment will be described based on the above result.

Upon termination (key-off) of the operation of the vehicle 1 (Step S1), the CPU (not shown) provided in the PHV controller 20 starts up the next operating time setting device 30 (Step S2). After starting up the next operating time setting device 30, the user (e.g., driver) can input the next operating time CL1 for the vehicle 1 to the next operating time setting device 30.

In Step S3, a check is made to determine whether the next operating time CL1 has been input to the next operating time setting device 30 by the user.

If NO, that is, if the next operating time CL1 has not been input to the next operating time setting device 30, Step S3 is repeated. If YES, that is, if the next operating time CL1 has been input to the next operating time setting device 30, the program proceeds to Step S4.

In Step S4, it is determined whether the plug 81P of the vehicle 1 has been inserted into the external electric power source XV.

If NO, that is, if the plug 81P has not been inserted into the external electric power source XV, Step S4 is repeated. If YES, that is, if the plug 81P has been inserted into the external electric power source XV, the program proceeds to Step S5.

In Step S5, a maintaining time TH for maintaining the SOC of the batteries 101 at the target SOC SC3 (SOC 90% in the first embodiment) until the next operating time CL1 is reached is calculated.

Concretely, the PHV controller 20 firstly calculates a charging time taken to charge the batteries from a present SOC SC1 (e.g., SOC 50%) to the target SOC SC3 (e.g., SOC 93%). Then, the above charging time is subtracted from the time elapsing between the present time CL0 indicated by the next operating time setting device 30 and the next operating time CL1 set by the next operating time setting device 30, thereby obtaining the maintaining time TH.

It should be noted that the SOC of the batteries 101 is calculated as needed, based on the integrated value of the currents during the past charges and discharges of the batteries 101.

It is determined whether the maintaining time TH calculated in Step S5 is no less than one hour (Step S6).

If NO, that is, if a first time T1 is less than one hour, the program proceeds to Step S9. If YES, that is, if the first time T1 is no less than one hour, the program proceeds to Step S7 (Execution of Step S7, Step S8, Step S10 is selected), because the time to be taken to maintain the SOC of the batteries at the target SOC SC3 is thought to be such a long time that the metal ions which constitute the positive active material PM progressively dissolve out.

In Step S7, the batteries 101 whose SOC is at the present SOC SC1 are charged until their SOC becomes equal to the overcharge SOC SC2 (e.g., SOC 93%). Specifically, a constant current charge with a constant current value is continued until the integrated current value reaches a value equivalent to the overcharge SOC SC2.

Upon the SOC of the batteries 101 becoming equal to the predetermined overcharge SOC SC2 in the manner described above, the charge by use of the external electric power source XV is completed.

Subsequently, in Step S8, the batteries 101 are discharged until their SOC becomes equal to the target SOC SC3 (SOC 90%). Specifically, the batteries 101 whose SOC is at the level of the overcharge SOC SC2 are discharged with a constant current value until the integrated current value reaches a value equivalent to the target SOC SC3. The electric charge discharged from the batteries 101 at that time is put back to the external electric power source XV. Alternatively, the above electric charge is used for the maintenance of the electric devices.

After discharging is done in this way, the program proceeds to Step S10.

In Step S9, the batteries 101 are charged until their SOC becomes equal to the target SOC SC3. Specifically, a constant current charge with a constant current value is continued until the integrated current value reaches a value equivalent to the target SOC SC3.

After the SOC of the batteries 101 has become equal to the target SOC SC3 in this way, the program proceeds to Step S10.

In Step S10, the SOC of the batteries 101 is maintained at the target SOC SC3 until the next operation starts.

The states of the positive active material particles 135 before and after the execution of the Steps S7 and S8 will be described with reference to FIG. 9.

Figure 9:
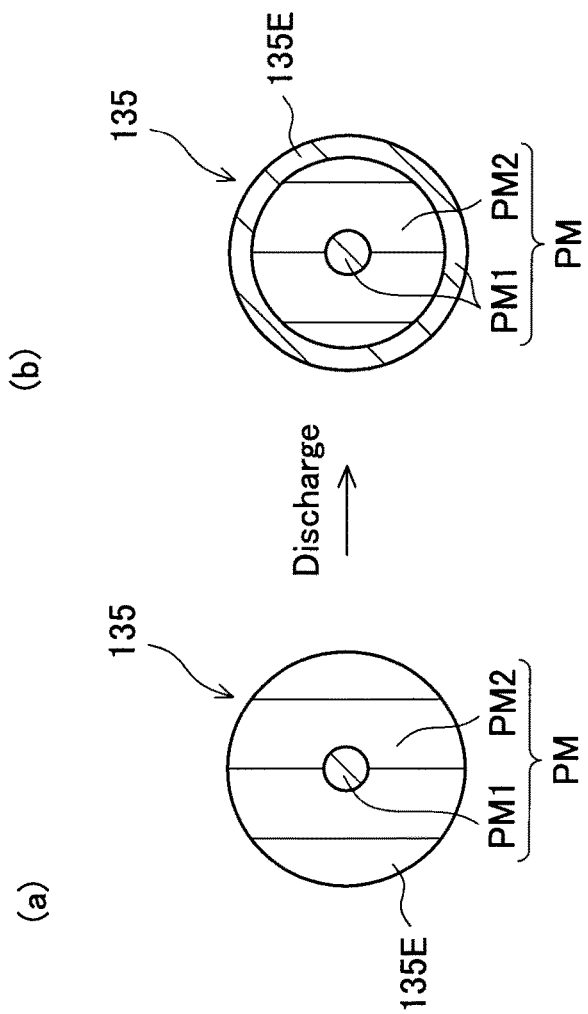
FIG. 9 is an explanatory view to show a positive active material particle in the first, second, and third embodiments, (a) showing the particle of a battery in an overcharge state and (b) showing the particle of the battery in a target charge state.

When the batteries 101 are charged up to the overcharge SOC SC2 (e.g., SOC 93%) in Step S7, the outer periphery (a substantially entire part of each particle excluding its central portion in FIG. 9) of each positive active material particle 135 assumes the second phase PM2 as illustrated in FIG. 9(a).

When the batteries 101 are discharged up to the target SOC SC3 (e.g., SOC 90%) in Step S8, the positive active material particles 135 are brought into a state where the first phase PM1 located at the outermost peripheries 135E of the positive active material particles 135 and the second phase PM2 located at the interior side of the outermost peripheries 135E coexist, as illustrated in FIG. 9(b). After completion of Step S8, the outermost peripheries 135E of the positive active material particles 135 are constituted by the first phase PM1 and therefore even if the positive active material particles 135 are left in the electrolytic solution 160 over the maintaining time TH that is as long as one hour or more, the metal ions contained in the first phase PM1 are unlikely to dissolve into the electrolytic solution 160. Accordingly, the decrease of the capacity of the batteries can be restrained.

In the first embodiment, Steps S5, S6, S7, S8 and S10 respectively correspond to the SOC maintenance prediction step, the selection step, the overcharge step, the discharge step, and the maintaining step.

The PHV controller 20 corresponds to the charge/discharge control means. The PHV controller 20 (the microcomputer included therein) that executes the respective steps corresponds to the overcharge means, the return discharge means, the maintaining means, the SOC maintenance prediction means and the selection means.

The PHV controller 20 (the microcomputer included in the PHV controller 20) also corresponds to the SOC maintenance prediction means and the first phase forming means.

In the method of charging and maintaining the batteries 101 according to the first embodiment, the batteries 101 are once charged up to the overcharge SOC SC2 in Step S7 and then, the batteries 101 are discharged until their SOC becomes equal to the target SOC SC3 in the return discharge step of Step S8. In this state (target SOC SC3), the outermost peripheries 135E of the positive active material particles 135 assume the first phase PM1 which is unlikely to cause dissolving of the metal ions into the electrolytic solution 160 (see FIG. 9(b)) so that the metal ions can be prevented from dissolving out of the positive active material particles 135 (second phase PM2). Accordingly, the method of charging and maintaining the batteries 101 can restrain the decrease of the capacity of the batteries 101.

Further, in the method of charging and maintaining the batteries 101 according to the first embodiment, the overcharge SOC SC2 is higher than the target SOC SC3 by 2% or more (3% in the first embodiment) in Step S7 (overcharge step). This enables it to reliably restrain the decrease of the capacity of the batteries 101.

The method of charging and maintaining the batteries 101 according to the first embodiment has Step S5 (SOC maintenance prediction step) and Step S6 (selection step). Therefore, the capacity of the batteries 101 can be unfailingly restrained from decreasing in cases where the batteries 101, liable to cause a decrease in battery capacity after charging, are maintained for as long as one hour or more.

In addition, the battery system M1 according to the first embodiment includes the overcharge means (the PHV controller 20 that executes Step S7), the return discharge means (the PHV controller 20 that executes Step S8) and the maintaining means (the PHV controller 20 that executes Step S10). In cases where the batteries 101 are maintained subsequently to charging, the SOC of the batteries 101 is once made equal to the overcharge SOC SC2 and then, the batteries 101 are discharged to make their SOC equal to the target SOC SC3. Thereafter, the batteries 101 can be maintained. As a result, the decrease of the capacity of the batteries 101 can be restrained.

The battery system M1 of the first embodiment includes the SOC maintenance prediction means (the PHV controller 20 that executes Step S5) and the selection means (the PHV controller 20 that executes Step S6). Therefore, the capacity of the batteries 101 can be unfailingly restrained from decreasing in cases where the batteries 101, liable to cause a decrease in battery capacity after charging, are maintained for as long as one hour or more.

The battery system M1 of the first embodiment includes the SOC maintenance prediction means (the PHV controller 20 that executes Step S5). The battery system M1 further includes the first phase forming means (the PHV controller 20 that executes Step S8) for making the SOC of the batteries 101 equal to the target SOC SC3 and making the outermost peripheries 135E of the positive active material particles 135 assume the first phase PM1 if the SOC maintenance prediction means predicts that the batteries 101 are to be maintained for no less than one hour. Further, the battery system M1 includes the maintaining means (the PHV controller 20 that executes Step S10) for maintaining the SOC of the batteries at the target SOC SC3. Therefore, when maintaining the batteries 101 at the target SOC SC3, the metal ions can be prevented from dissolving into the electrolytic solution 160 from the positive active material particles 135 (second phase PM2) thereby to properly restrain the decrease of the capacity of the batteries 101.

In addition, since the vehicle 1 of the first embodiment is equipped with the above-described battery system M1, the decrease of the capacity of the batteries 101 can be reliably restrained in the vehicle 1.

Second Embodiment

Reference is now made to FIGS. 3 to 7 and FIGS. 9 to 11 to describe a second embodiment of the invention.

Figure 10:
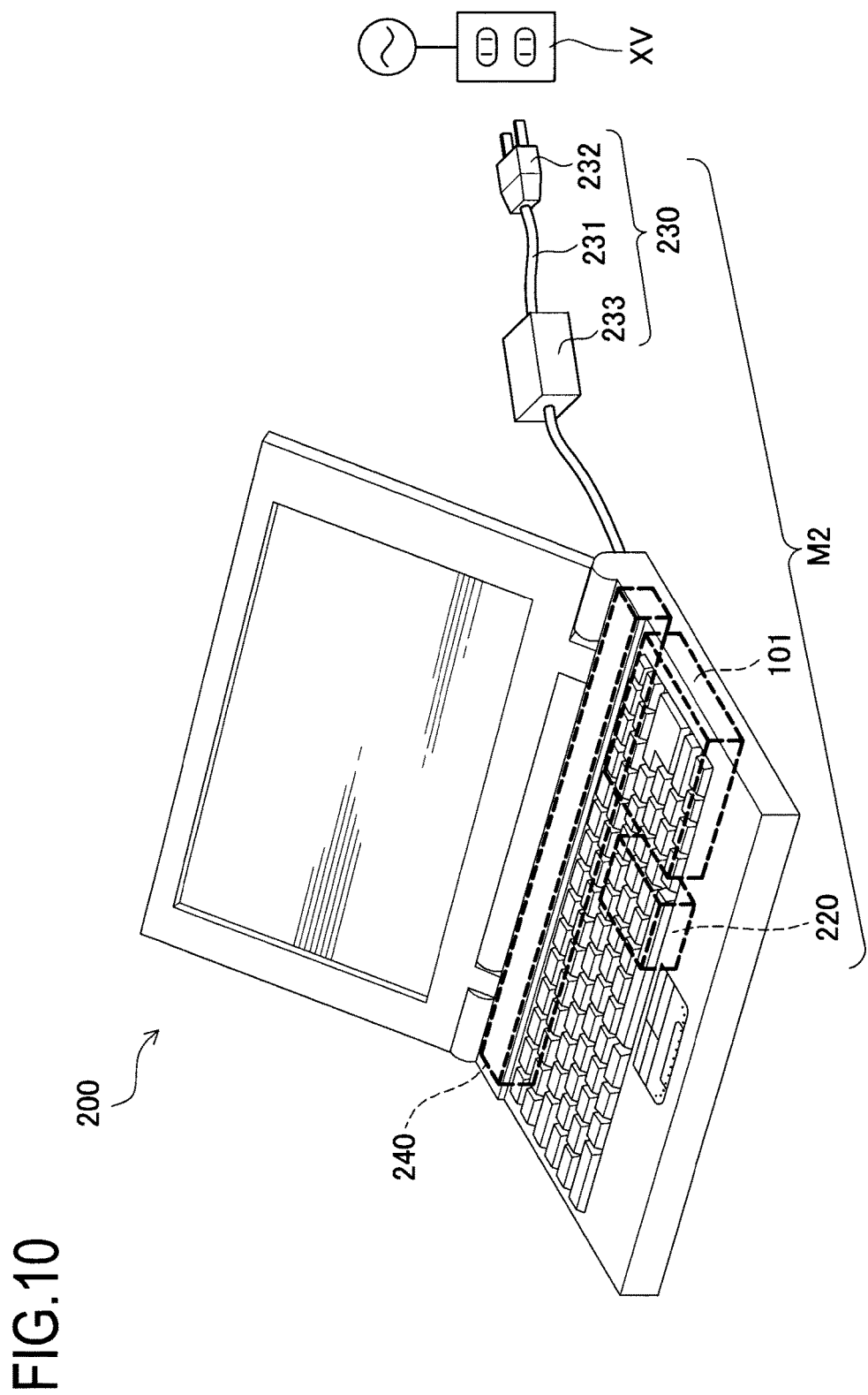
FIG. 10 is a perspective view of a notebook PC in the second embodiment.

First, a notebook-sized personal computer (hereinafter referred to as "notebook PC") 200 will be described according to the second embodiment. FIG. 10 shows a perspective view of the notebook PC 200.

The notebook PC 200 has the batteries 101 similar to those of the first embodiment and a battery controller 220 for controlling the charge and discharge of the batteries 101. In addition to these components, the notebook PC 200 has an AC power adapter 230 including a plug 232 disposed at the leading end of a cable 231 and a converter 233 disposed in the middle of the cable 231; and an air cooling fan 240 for cooling the battery controller 220 and the batteries 101.

The notebook PC 200 is equipped with a battery system M2 constituted by the above-described batteries 101, battery controller 220 and AC power adapter 230 (the cable 231, the plug 232 and a converter 233).

Of these components, the AC power adapter 230 can charge the batteries 101 by inserting the plug 232 into the external electric power source XV installed outside the notebook PC 200. It also can supply electric power to the battery controller 220.

The battery controller 220 includes a microcomputer that is provided with a CPU, ROM and RAM (which are not shown in the drawings) and operated according to a specified program. The battery controller 220 performs various controls on the batteries 101 in accordance with the respective conditions of the components of the notebook PC 200. For instance, it performs, through the AC power adapter 230, charge control for charging the batteries 101 with power from the external electric power source XV and discharge control for discharging the batteries 101.

The batteries 101 are the same as those of the first embodiment described above and therefore a detailed explanation thereof is omitted herein.

A charging and maintaining method by use of the battery system M2 according to the second embodiment will be described with reference to the flow chart of FIG. 11.

First, operation of the notebook PC 200 is terminated (Step S21). In Step S22, a check is made to determine whether the plug 232 of the AC power adapter 230 has been inserted into the external electric power source XV.

If NO, that is, if the plug 232 has not been inserted into the external electric power source XV, Step S22 is repeated. If YES, that is, if the plug 232 has been inserted into the external electric power source XV, the program proceeds to Step S23.

Subsequently, in Step S23, the batteries 101, whose SOC is at the level of the present SOC SC1, are charged until their SOC becomes equal to the overcharge SOC SC2 (e.g., SOC 93%). After their SOC becomes equal to the overcharge SOC SC2, the charging by the external electric power source XV is completed.

Subsequently, in Step S24, the batteries 101 are discharged until their SOC becomes equal to the target SOC SC3 (SOC 90%), and then the program proceeds to Step S25.

In Step S25, the SOC of the batteries 101 is maintained at the target SOC SC3.

Figure 11:
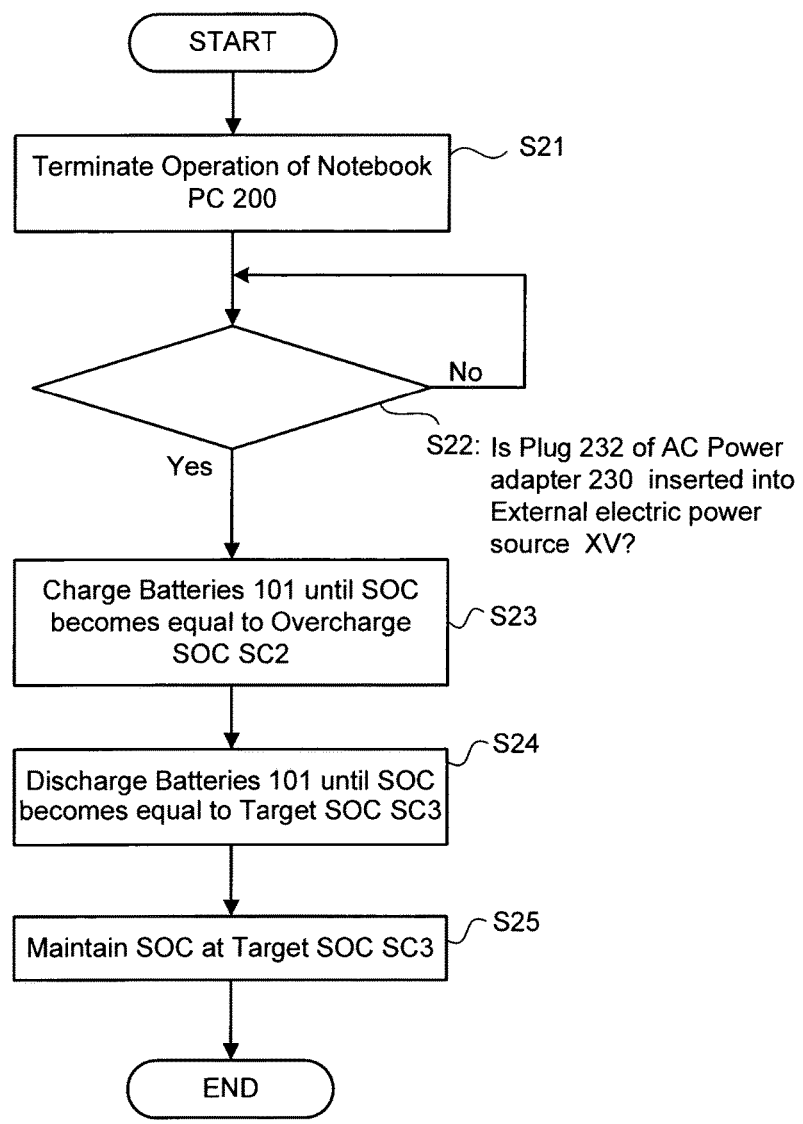
FIG. 11 is a flowchart showing a method of charging and maintaining a battery in the second embodiment.
Figure 12:
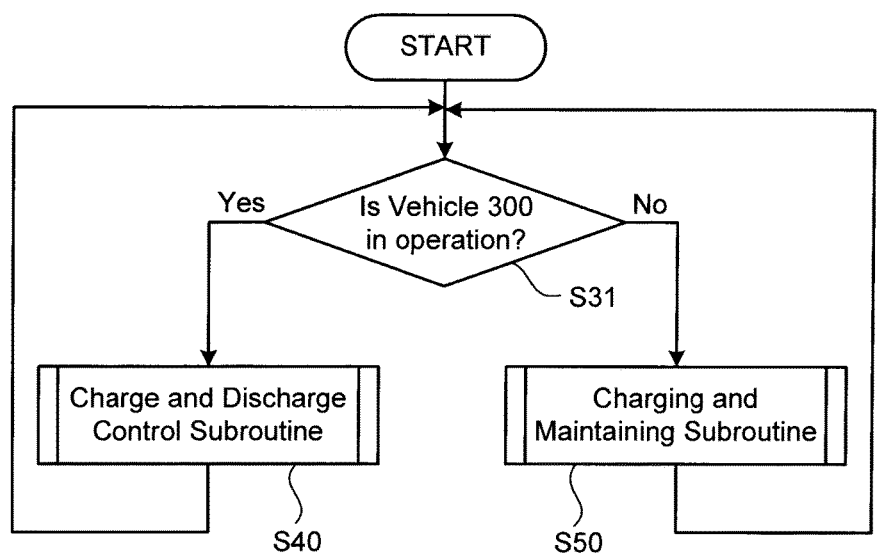
FIG. 12 is a flowchart showing a battery in the third embodiment.

The processes (charging and maintaining) shown in the flow chart of FIG. 11 are completed, for instance, if the notebook PC 200 starts its operation.

Since the notebook PC 200 of the second embodiment is equipped with the above-described battery system M2, the decrease of the capacity of the batteries 101 can be reliably restrained in the notebook PC 200.

Third Embodiment

Reference is now made to FIGS. 1 to 7, 9 and 12 to 14 to describe a third embodiment of the invention.

The third embodiment does not differ from the first embodiment except that a vehicle 301 of the third embodiment employs a charging and discharging method capable of providing an improvement in the output properties of the batteries during operation of the vehicle in addition to the same effects as of the charging and maintaining method of the first embodiment.

Points differing from the first embodiment will be mainly described herein whereas an explanation of similar points is omitted or simplified. Parts that are substantially equivalent to those described earlier have substantially similar operational effects. The same reference numerals are used to identify the same or similar features in the first to third embodiments.

First, the vehicle 301 constructed according to the third embodiment will be described. FIG. 1 shows a perspective view of the vehicle 301.

The vehicle 301 includes, like the first embodiment, a plurality of batteries 101, the PHV controller 20 and the next operating time setting device 30. Similarly to the first embodiment, the vehicle 301 is a plug-in hybrid electric vehicle having the front motor 41, the rear motor 42, the engine 50, the cable 60, the inverter 71, the converter 72, the vehicle body 90 and the plug-equipped cable 81 including the plug 81P disposed at the leading end thereof.

The vehicle 301 includes a battery system M3 composed of the engine 50, the front motor 41, the rear motor 42, the cable 60 and the inverter 71, in addition to the above-described assembled battery 10 (batteries 101), PHV controller 20, next operating time setting device 30, converter 72 and plug-equipped cable 81 (plug 81P).

The inventors have found from their study that when the batteries 101 using the positive active material particles 135 in the positive electrode plate 130 are charged with an amount higher than or equal to a first reference value (the amount of electricity required to increase the SOC of the batteries 101 by SOC 5%) after discharging, the batteries 101 can exhibit more improved output characteristics (discharge characteristics) in the next discharge, compared to the case where no charging is performed.

It has also been found that the above improvement in the output characteristics can be achieved provided that the SOC of the batteries 101 immediately before the charging falls within the range of from SOC 5% to SOC 90%.

It has also been found that the energy efficiency (charge efficiency) of the batteries 101 decreases in cases where the amount of charge is made higher than a second reference value (the amount of electricity required to increase the SOC of the batteries 101 by SOC 15%).

A charge/discharge method as well as a charging and maintaining method by use of the above battery system M3 will be described based on the knowledge described above with reference to the flow charts of FIGS. 12 to 14.

First, in Step S31, a check is made to determine whether the vehicle 301 is in operation. Specifically, the PHV controller 20 checks whether the vehicle 301 has been started up and brought into a key-on state.

If YES, that is, if the vehicle 301 is in operation, the program proceeds to a charge and discharge control subroutine Step S40. If NO, that is, if the vehicle 301 is not in operation, the program proceeds to a charging and maintaining subroutine Step S50.

Figure 13:
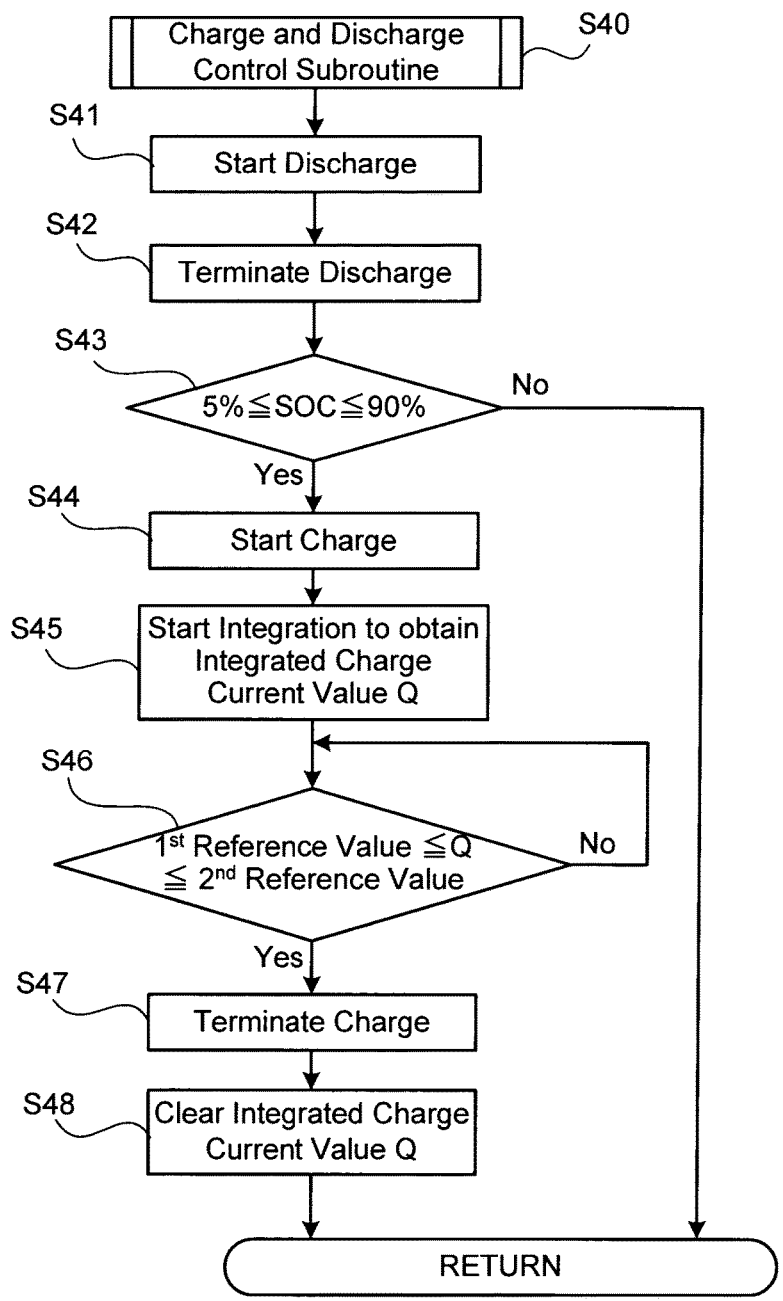
FIG. 13 is a flowchart showing the battery in the third embodiment.

In the charge and discharge control subroutine Step S40, discharge of the batteries 101 is first started as shown in FIG. 13 (Step S41). Thereafter, the program proceeds to Step S42 to complete the discharge of the batteries 101.

The SOC of the batteries 101 in Step S42 is calculated based on the integrated value of the currents during the past charges and discharges of the batteries 101.

Then, in Step S43, it is determined whether the SOC of the batteries 101 is not lower than SOC 5% and not higher than SOC 90%.

If NO, that is, if the SOC of the batteries 101 is not a value that is not lower than SOC 5% and not higher than SOC 90%, the program returns to Step S31 of the main routine without charging. If YES, that is, if the SOC of the batteries 101 is a value that is not lower than SOC 5% and not higher than SOC 90%, the program proceeds to Step S44 to start charging of the batteries 101. Specifically, the engine 50 is turned over and electric power generated in the front motor 41 by the operation of the engine 50 is supplied to the batteries 101, thereby charging the batteries 101.

Then, the program proceeds to Step S45 to start integration to obtain an integrated charge current value Q. This integrated charge current value Q is the sum of electricity supplied to the batteries 101 from the time point of starting the charging. Then, the program proceeds to Step S46 to determine whether the first reference value≤the integrated charge current value Q≤the second reference value holds.

If NO, that is, if the first reference value≤the integrated charge current value Q≤the second reference value does not hold, the program returns to Step S46 for repeating. If YES, that is the first reference value≤the integrated charge current value Q≤the second reference value holds, the program proceeds to Step S47 to terminate the charging of the batteries 101.

In Step S48, the integrated charge current value Q is cleared (the value of the integrated charge current value Q is set back to zero) and then, the program returns to Step S31 of the main routine.

Figure 14:
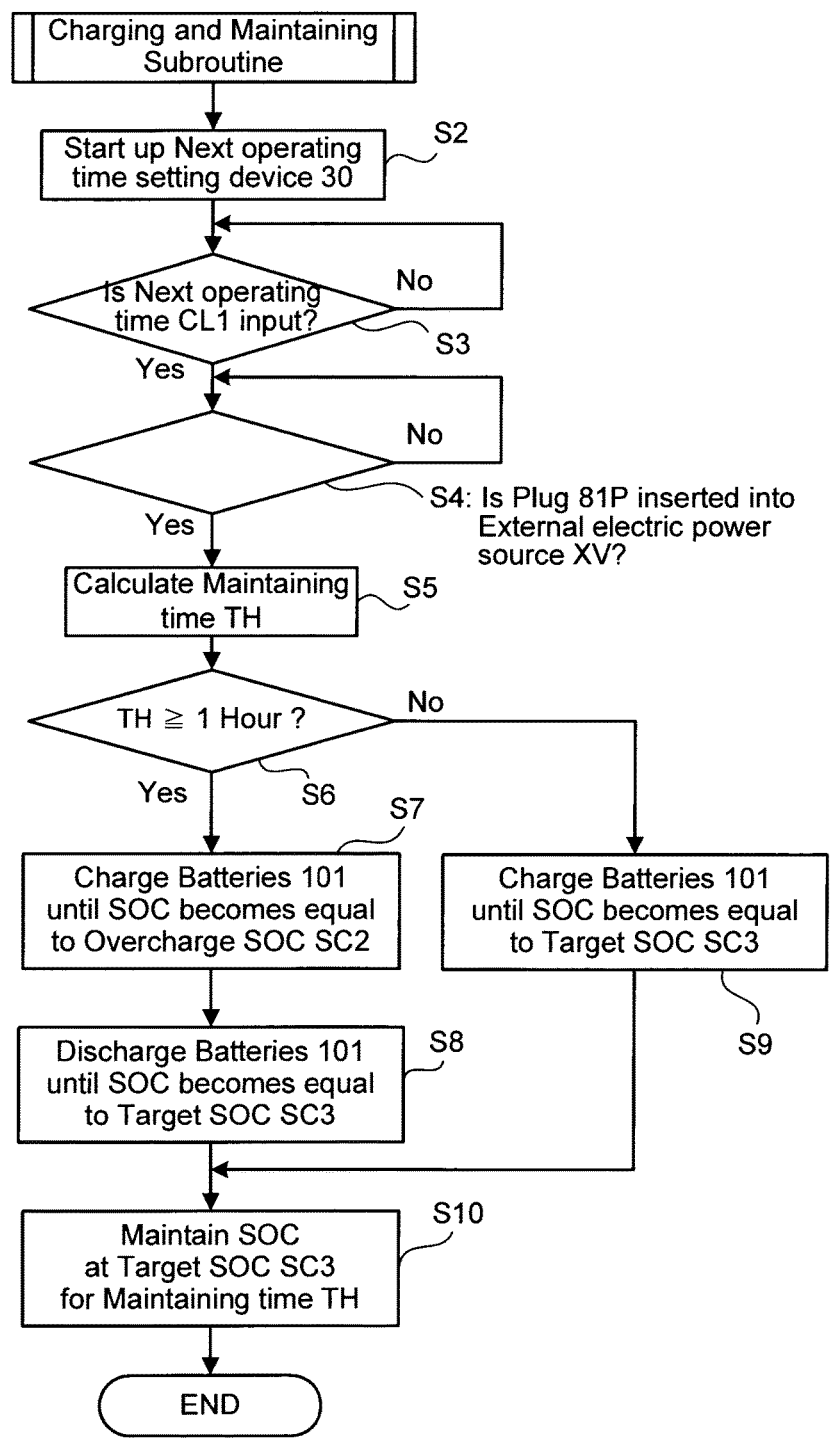
FIG. 14 is a flowchart showing the battery in the third embodiment

The charging and maintaining subroutine Step S50 is the same as Step S2 to Step S10 described in the first embodiment as shown in FIG. 14 and therefore an explanation thereof is omitted herein.

As described earlier, the battery system M3 of the vehicle 301 according to the third embodiment includes, in its control flow (FIG. 12), the charge and discharge control subroutine S40 and the charging and maintaining subroutine S50.

Of these subroutines, the charge and discharge control subroutine S40 is such that the batteries 101 are discharged in Step S41 and then, in Steps S44, S45, the batteries 101 are charged by an amount that is not lower than the first reference value and not higher than the second reference value. The battery system M3 accordingly enables the batteries 101 to exhibit excellent output characteristics.

The charging and maintaining subroutine S50 is such that after the batteries 101 are once charged to make their SOC equal to the overcharge SOC SC2 in Step S7, the batteries 101 are discharged to make their SOC equal to the target SOC SC3 in the return discharge step of Step S8. In this way, the battery system M3 can restrain the decrease of the capacity of the batteries 101.

Although the invention has heretofore been described according to the first to third embodiments, it is apparent that the invention is not necessarily limited to the particular embodiments shown herein and various changes and modifications are made to the disclosed embodiments without departing from the spirit and scope of the invention.

For instance, the batteries 101 of the first and other embodiments have a positive active material consisting of LiFePO$_4$ in the positive electrode plate. However, the positive electrode plate has only to have a two-phase coexistence type positive active material and examples of such a positive active material include the lithium compound oxide represented by LiMPO$_4$ (M contains, in addition to Fe, at least one or more selected from the group consisting of Mn, Cr, Co, Cu, Ni, V, Mo, Ti, Zn, Al, Ga, Mg, B and Nb).

In the third embodiment, the batteries 101 are charged by the operation of the engine 50 until the integrated charge current value Q of the batteries 101 satisfies the first reference value≤the integrated charge current value Q≤the second reference value. However, the charging may be carried out by other components than the engine 50 such as a regeneration brake and an auxiliary battery until the integrated charge current value Q of the batteries 101 satisfies the first reference value≤the integrated charge current value Q≤the second reference value. In addition, if the integrated charge current value Q of the batteries 101 obtained by charging by the regeneration brake, auxiliary battery or the like does not satisfy the first reference value≤the integrated charge current value Q≤the second reference value, the batteries 101 may be further charged by operating, for instance, the engine 50 until the integrated charge current value Q satisfies the first reference value≤the integrated charge current value Q≤the second reference value.

The invention claimed is:

1. A method of charging and maintaining at least one of lithium ion secondary batteries, each using positive active material particles in its positive electrode plate, the positive active material particles being made from a two-phase coexistence type positive active material in which a first phase including Li ions inserted therein and a second phase from which Li ions have been desorbed coexist, the method comprising:
an overcharge step for simultaneously charging all of the at least one of the lithium ion secondary batteries to an overcharge SOC (state of charge) that is not higher than 100% SOC but higher than a target SOC;
a return discharge step for simultaneously discharging, after the overcharge step, all of the at least one of the lithium ion secondary batteries to make the SOC of all of the at least one of the batteries equal to the target SOC and make outermost peripheries of the positive active material particles be the first phase; and
a maintaining step for simultaneously maintaining, following the return discharge step, the SOC of all of the at least one of the lithium ion secondary batteries at the target SOC until next discharge of all of the at least one of the lithium ion secondary batteries is started, wherein the maintaining step includes maintaining the target SOC without increasing and decreasing the SOC of all of the at least one of the lithium ion secondary batteries.

2. The method of charging and maintaining at least one of lithium ion secondary batteries according to claim 1, wherein
the overcharge step includes charging all of the at least one of the lithium ion secondary batteries to the overcharge SOC that is higher than the target SOC by 2% or more.

3. The method of charging and maintaining at least one of lithium ion secondary batteries according to claim 1, wherein
the method further comprises:
a maintenance prediction step for predicting whether all of the at least one of the lithium ion secondary batteries will be maintained at the target SOC for no less than one hour, the target SOC being higher than a present SOC; and
a selection step for selecting execution of the overcharge step, the return discharge step and the maintaining step if it is predicted in the maintenance prediction step that all of the at least one of the lithium ion secondary batteries will be maintained at the target SOC for no less than one hour.

4. A battery system comprising:
at least one lithium ion secondary batteries, each using positive active material particles in its positive electrode plate, the positive active material particles being made from a two-phase coexistence type positive active material in which a first phase including Li ions therein and a second phase from which Li ions have been desorbed coexist; and
charge and discharge control means for controlling the charge and discharge of all of the at least one of the lithium ion secondary batteries,
the charge and discharge control means comprising:
overcharge means for simultaneously charging all of the at least one of the lithium ion secondary batteries to an overcharge SOC (state of charge) that is not higher than 100% SOC but higher than a target SOC;
return discharge means for simultaneously discharging, after operation of the overcharge means, all of the at least one of the lithium ion secondary batteries to make the SOC of all of the at least one of the lithium ion secondary batteries equal to the target SOC and make outermost peripheries of the positive active material particles be the first phase; and
maintaining means for simultaneously maintaining, following discharge by the return discharge means, the SOC of all of the at least one of the lithium ion secondary batteries at the target SOC until next discharge of all of the at least one of the lithium ion secondary batteries is started, wherein the maintaining means includes maintaining means for maintaining the target SOC without increasing and decreasing the SOC of all of the at least one of the lithium ion secondary batteries.

5. The battery system according to claim 4, wherein
the overcharge means charges all of the at least one of the lithium ion secondary batteries to the overcharge SOC that is higher than the target SOC by 2% or more.

6. The battery system according to claim 4, wherein
the charge and discharge control means further comprises:
maintenance prediction means for predicting whether all of the at least one of the lithium ion secondary batteries will be maintained at the target SOC for no less than one hour, the target SOC being higher than a present SOC; and
selection means for selecting execution of the overcharge means, the return discharge means, and the maintaining means if it is predicted by the maintenance prediction means that all of the at least one of the lithium ion secondary batteries will be maintained at the target SOC for no less than one hour.

7. A vehicle rechargeable from an external power source, the vehicle including the battery system according to claim 4.

8. A battery-mounted device including the battery system according to claim 4.

9. The method of charging and maintaining at least one of lithium ion secondary batteries according to claim 2, wherein
the method further comprises:
a maintenance prediction step for predicting whether all of the at least one of the lithium ion secondary batteries will be maintained at the target SOC for no less than one hour, the target SOC being higher than a present SOC; and
a selection step for selecting execution of the overcharge step, the return discharge step and the maintaining step if it is predicted in the maintenance prediction step that all of the at least one of the lithium ion secondary batteries will be maintained at the target SOC for no less than one hour.

10. The battery system according to claim 5, wherein
the charge and discharge control means further comprises:
maintenance prediction means for predicting whether all of the at least one of the lithium ion secondary batteries will be maintained at the target SOC for no less than one hour, the target SOC being higher than a present SOC; and
selection means for selecting execution of the overcharge means, the return discharge means, and the maintaining means if it is predicted by the maintenance prediction means that all of the at least one of the lithium ion secondary batteries will be maintained at the target SOC for no less than one hour.

11. A battery system including:
at least one of lithium ion secondary batteries, each using positive active material particles in its positive electrode plate, the positive active material particles being made from a two-phase coexistence type positive active material in which a first phase including Li ions inserted therein and a second phase from which the Li ions have been desorbed coexist; and
charge and discharge control means for controlling the charge and discharge of all of the at least one of the lithium ion secondary batteries,
wherein the battery system comprises:
SOC maintenance prediction means for predicting whether all of the at least one of the lithium ion secondary batteries will be maintained at a target SOC for no less than one hour;
first phase forming means for making the SOC of all of the at least one of the lithium ion secondary batteries equal to the target SOC and making the outermost peripheries of the positive active material particles be the first phase if the SOC maintenance prediction means predicts that all of the at least one of the lithium ion secondary batteries will be maintained for no less than one hour; and
maintaining means for maintaining the SOC of all of the at least one of the lithium ion secondary batteries at the target SOC.

* * * * *